United States Patent
Thomas et al.

(10) Patent No.: US 11,975,998 B2
(45) Date of Patent: May 7, 2024

(54) COMPONENTS MADE OF GLASS OR GLASS CERAMIC HAVING PREDAMAGE ALONG PREDETERMINED DIVIDING LINES

(71) Applicant: SCHOTT AG, Mainz (DE)

(72) Inventors: Jens Ulrich Thomas, Mainz (DE); Frank-Thomas Lentes, Bingen (DE); Andreas Ortner, Gau-Algesheim (DE); Jonas Schatz, Mainz (DE); Michael Kluge, Offenbach a.M. (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 18/171,037

(22) Filed: Feb. 17, 2023

(65) Prior Publication Data

US 2023/0202903 A1 Jun. 29, 2023

Related U.S. Application Data

(63) Continuation of application No. 16/688,680, filed on Nov. 19, 2019, now Pat. No. 11,613,492, which is a
(Continued)

(30) Foreign Application Priority Data

May 19, 2017 (DE) .............. 10 2017 110 967.6

(51) Int. Cl.
*C03B 33/02* (2006.01)
*B23K 26/53* (2014.01)
*B23K 103/00* (2006.01)

(52) U.S. Cl.
CPC .......... *C03B 33/0222* (2013.01); *B23K 26/53* (2015.10); *B23K 2103/54* (2018.08)

(58) Field of Classification Search
CPC ... C03B 33/0222; C03B 33/082; B23K 26/53; B23K 2103/54; Y02P 40/57; B60J 1/00
See application file for complete search history.

(56) References Cited

U.S. PATENT DOCUMENTS

| | | | |
|---|---|---|---|
| 2005/0024743 A1 | 2/2005 | Camy-Peyret | |
| 2013/0210245 A1* | 8/2013 | Jackl | H01L 21/486 439/64 |

(Continued)

FOREIGN PATENT DOCUMENTS

| | | |
|---|---|---|
| CN | 104914492 | 9/2015 |
| CN | 106560269 | 4/2017 |

(Continued)

OTHER PUBLICATIONS

English translation of International Search Report dated Jul. 24, 2018 for PCT/EP2018/060059, 3 pages.
(Continued)

*Primary Examiner* — Brian Handville
(74) *Attorney, Agent, or Firm* — Ruggiero McAllister & McMahon LLC

(57) ABSTRACT

A component of glass or glass ceramic having predamages arranged along at least one predetermined dividing line is provided. The dividing line has a row of predamages lying one behind the other. The predamages pass continuously through the glass or the glass ceramic with at least 90% of the predamages being cylindrically symmetrical. The glass or the glass ceramic has a material compaction of at least 1% relative to an actual material density in a radius of 3 μm about a longitudinal axis of respective pre-damaged points. The relative weight loss per pre-damaged point is less than 10% and the component has a thickness of at least 3.5 mm.

19 Claims, 8 Drawing Sheets

Related U.S. Application Data continuation of application No. PCT/EP2018/060059, filed on Apr. 19, 2018.

(56) References Cited

U.S. PATENT DOCUMENTS

| | | | |
|---|---|---|---|
| 2014/0017475 A1 | 1/2014 | Teranishi | |
| 2014/0199519 A1 | 7/2014 | Schillinger | |
| 2015/0038313 A1* | 2/2015 | Hosseini | B23K 26/0648 |
| | | | 219/121.75 |
| 2015/0299018 A1 | 10/2015 | Bhuyan | |
| 2016/0031745 A1 | 2/2016 | Ortner | |
| 2016/0067822 A1 | 3/2016 | Arai | |
| 2016/0200621 A1 | 7/2016 | N'Gom | |
| 2017/0259375 A1 | 9/2017 | Kumkar | |
| 2018/0117708 A1 | 5/2018 | Ortner | |
| 2018/0118603 A1 | 5/2018 | Nieber | |
| 2018/0134604 A1 | 5/2018 | Ortner | |
| 2018/0134606 A1 | 5/2018 | Wagner | |
| 2018/0221991 A1 | 8/2018 | Ortner | |
| 2018/0297887 A1 | 10/2018 | Spier | |
| 2018/0345419 A1 | 12/2018 | Mikutis | |
| 2018/0370840 A1 | 12/2018 | Plapper | |
| 2019/0157218 A1* | 5/2019 | Jackl | H01L 23/49827 |
| 2019/0322564 A1 | 10/2019 | Wagner | |

FOREIGN PATENT DOCUMENTS

| | | |
|---|---|---|
| DE | 102012110971 | 5/2014 |
| DE | 102014116957 | 5/2016 |
| DE | 102015110422 | 12/2016 |
| DE | 102015111490 | 1/2017 |
| DE | 102015111491 | 1/2017 |
| DE | 102015116846 | 4/2017 |
| DE | 102015116848 | 4/2017 |
| DE | 102015120950 | 6/2017 |
| DE | 102016102768 | 8/2017 |
| DE | 102017100015 | 7/2018 |
| DE | 102017100755 | 7/2018 |
| DE | 102017206461 | 10/2018 |
| EP | 2754524 | 7/2014 |
| EP | 2922793 A1 | 9/2015 |
| KR | 101407994 | 6/2014 |
| WO | 2014079478 | 5/2014 |

OTHER PUBLICATIONS

English translation of Written Opinion dated Jul. 24, 2018 for PCT/EP2018/060059, 7 pages.
Itoh, "Ultrafast Processes for Bulk Modification of Transparent Materials", MRS Bulletin, vol. 31, Aug. 2006, pp. 620-625.
Eaton, Transition from thermal diffusion to heat accumulation in high repetition rate femtosecond laser writing of buried optical waveguides, Optics Express, vol. 16, No. 13, Jun. 23, 2008, pp. 9443-9458.
English translation of International Preliminary Report on Patentability dated Nov. 19, 2019 for PCT/EP2018/060059, 8 pages.
Little, "Structural changes in BK7 glass upon exposure to femtosecond laser pulses", Journal of Raman Spectroscopy, Sep. 28. 2010, 4 pages.
Kitamura, "Refractive index of densified silica glass", Journal of Non-Crystaline Solids, No. 159, 1993, pp. 241-245.
Zhang, "Simulation of microscale densification during femtosecond laser processing of dielectric materials", Applied Physics A - Materials Science & Processing, vol. 79, 2004, pp. 945-948.
Sakakura, "Initial temporal and spatial changes of the refractive index induced by focused femtosecond pulsed laser irradiation inside a glass", Physical Review B, vol. 71, 2005, p. 024113-1 to 0024113-12.

* cited by examiner

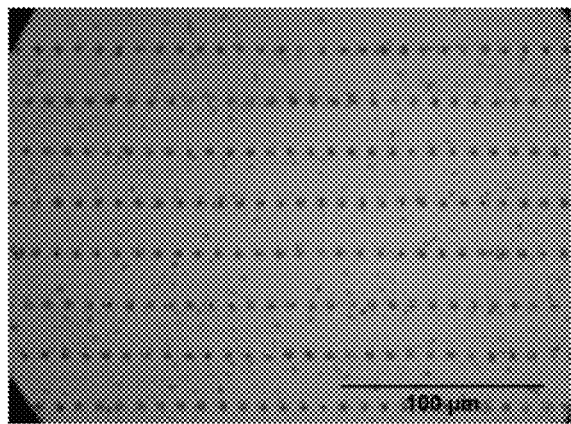
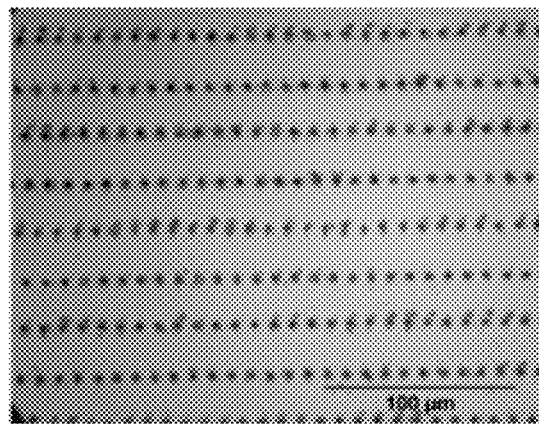
FIG. 4a
FIG. 4b

COMPONENTS MADE OF GLASS OR GLASS CERAMIC HAVING PREDAMAGE ALONG PREDETERMINED DIVIDING LINES

CROSS REFERENCE TO RELATED APPLICATIONS

This application is a continuation of U.S. patent application Ser. No. 16/688,680 filed Nov. 19, 2019, which is a continuation of International Application PCT/EP2018/060059 filed Apr. 19, 2018, which claims benefit under 35 USC § 119 of German Application 10 2017 110 967.6 filed May 19, 2017, the entire contents of all of which are incorporated herein by reference.

BACKGROUND

1. Field of the Invention

The present disclosure relates to components made of glass or glass ceramic having predamage along predetermined dividing lines.

2. Description of Related Art

Components are known which comprise glass or glass ceramic and have predamages along a predetermined dividing line.

Such components may in particular be produced with the methods and devices described in the following publications: DE 10 2012 110 971 A1, DE 10 2015 110 422 A1, DE 10 2015 116 848 A1, DE 10 2015 111 491 A1, DE 10 2015 116 846 A1, DE 10 2015 111 490 A1, DE 10 2015 120 950 A1, DE 10 2016 102 768 A1, DE 10 2017 100 015.1, DE 10 2017 206 461.7, DE 10 2017 100 755.5, DE 10 2017 103 381.5, EP 2 754 524 A1, US 2005/0024743 A1, KR 101 407994 B1.

In thicker components, in particular those with a thickness of more than 3.5 mm, it has been found that after separation along the predetermined dividing line, the cut edge has very poor quality and in particular a high roughness. This regularly leads to an increased rejection rate of the cut components.

In particular for windows for transport vehicles, such as motor vehicles, aircraft or rail vehicles, refined components comprising glass or glass ceramic are required in which after separation, the cut edges must have a high quality and in particular a low roughness. Here it is necessary for such components to be produced economically with low rejection rate, and be able to be used without problems in the subsequent further treatment processes. Such components often comprise two different glass panes which are laminated with an intermediate film of plastic and separated along at least one dividing line.

Thicker glass and glass ceramic components (e.g. glass ceramics based on lithium aluminum silicate), i.e. glass and glass ceramic panes with a thickness of at least 3.5 mm, constitute a particular challenge for further processing: Cuts can only be made along straight lines, continuously from edge to edge, using conventional engraved cutting methods.

Tolerances of less than one millimeter can only be achieved with costly multi-step methods, e.g. engraved breaking, mechanical milling and subsequent polishing.

The absence of particles cannot be guaranteed with the former methods, i.e. subsequent coatings require complex cleaning of the glass and glass ceramic substrates.

SUMMARY

It is the object of the invention to provide thicker components, in particular components with a thickness of at least 3.5 mm, which comprise glass or glass ceramic and have predamages arranged along a predetermined dividing line, which, after separation along the predetermined dividing line, have a better quality and lower roughness of the cut edge, leading to lower rejection rates, and which can be used without problems in further treatment processes. A further object of the invention is to provide a method and device for producing such components, and a preferred usage thereof.

This object is achieved by a component that includes glass or glass ceramic, having predamages arranged along at least one predetermined dividing line, wherein the dividing line consists of a row of predamages lying one behind the other, the predamages pass continuously through the glass or the glass ceramic, at least 90% of the predamages are cylindrically symmetrical, the glass or the glass ceramic has a material compaction of at least 1% relative to the actual material density in a radius of 3 µm about the longitudinal axis of the respective pre-damaged point, the relative weight loss per pre-damaged point is less than 10%, and the component has a thickness of at least 3.5 mm.

The component may preferably have a thickness of at least 5 mm, particularly preferably at least 8 mm. Preferably, the component has a thickness in the range from at least 3.5 mm to maximum 50 mm.

BRIEF DESCRIPTION OF THE DRAWINGS

FIGS. 4a and 4b show 2D matrices of cylindrical predamages according to the present disclosure.

DETAILED DESCRIPTION

Figure 1A:
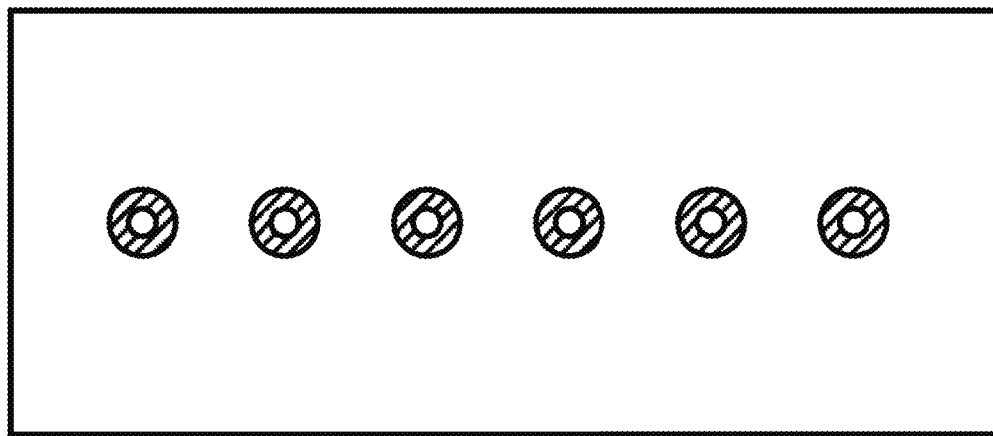
FIG. 1a shows a top view of an enlarged extract of a glass component with predamages according to the present disclosure.

The inventors have found that in thicker components, in particular components with a thickness of at least 3.5 mm, it is necessary for the dividing line to consist of a row of predamages arranged one behind the other, and that the predamages must pass continuously through the glass or glass ceramic.

The more predamages are formed so as to be cylindrical, the more successfully the first object is achieved. The inventors were able to show that at least 90% of the predamages must be formed so as to be cylindrically symmetrical. Preferably, at least 95% of the predamages are formed so as to be cylindrically symmetrical, particularly preferably at least 98%, and quite particularly preferably, substantially all predamages.

The inventors were furthermore able to show that the glass or glass ceramic must have a material compaction of at least 1% relative to the actual material density in a radius of 3 µm about the longitudinal axis of the respective pre-damaged point, and the relative weight loss per pre-damaged point must be less than 10% in order to achieve the basic object. It is assumed that in thicker components with a thickness of at least 3.5 mm, the pre-damaged point must be formed such that the density of the material increases around the pre-damaged point and as little material as possible is removed or lost (low weight loss).

The fact that the glass or glass ceramic has a material compaction of at least 1% relative to the actual material density in a radius of 3 µm about the longitudinal axis of the respective cylindrically symmetrical pre-damaged point, was determined by means of the following measurement process: Lena Bressel, Dominique de Ligny, Camille Sonneville, et al. "Femtosecond laser induced density changes in $GeO_2$ and $SiO_2$ glasses: Fictive temperature effect [Invited]", Optical Materials Express, Vol. 1, No. 4, 605 613 (1 Aug. 2011) DOI:10.1364/OME.1.000605. The evidence of material compaction was provided indirectly via a spectral shift in the Nd peak in the Raman spectrum. For this, the Raman microscope required a spectral range of 10000 $cm^{-1}$ so that, on excitation with 488 nm, the Nd luminescence could be measured at around 890 nm, and it had to be equipped with suitable motorized XYZ stepper motor axes and a suitable microscope lens (NA>0.7) in order to achieve a spatial resolution of less than one micron. The components according to the invention were scanned in the region to be measured by means of the stepper motors. At each point, a Raman spectrum of the Nd peak was recorded. Its spectral position was recorded and back-calculated for pressures and densities using standard spectra. These standard spectra were taken from glass or glass ceramic bodies which had been compacted with belt presses. A further check could be made using spatially resolved Brillouin spectra.

The fact that the relative weight loss per pre-damaged point was less than 10% was determined as follows (here, as an example, for a 2 mm thick soda-lime glass which was brought to a size of 150×250 $mm^2$ by manual engraving and breaking with a conventional glass cutter): particles, fingerprints and other contamination were eliminated by cleaning both sides with glass cleaner, ethanol and compressed air, manually or in an automated cleaning process (washing machine). The specimen prepared in this way was then weighed on a precision scale (Mettler Toledo AB204-S). The total structure was surrounded by a transparent plastic box to increase the measurement precision. The specimen was then attached to the holder of an XY axis system (Aerotech Inc., 3D Micromac microSTRUCT). It was oriented against two stops and secured against slipping using commercial adhesive tape. Laser machining took place using a Lumera HyperRapid with a wavelength of 1064 nm and a pulse energy of 400 µJ. Also, a 16 mm biconvex lens (Thorlabs, Inc.) was used. The distance from the lens to the specimen was set such that the focal point lay 1.6 mm below the surface. At a laser frequency of 100 kHz, the glass specimen was accelerated in the X direction to a speed of 1 m/s. After a defined acceleration distance, the diaphragm of the laser was opened for a distance of 90 mm, which produced a dividing line consisting of a row of 9000 predamages lying one behind the other at intervals of 10 µm. Then the glass specimen was moved in the Y direction by 10 µm and the entire laser process repeated 16,000 times. This produced a two-dimensional matrix of predamages with a size of 90×160 $mm^2$ (see FIG. 4). The adhesive tape was then removed and the specimen was weighed one more time. To exclude falsification of the measurement result, which could have resulted from the deposition of particles during the laser process, the above-mentioned cleaning steps (glass cleaner, ethanol, compressed air) or automated cleaning process were carried out one more time and the specimen weighed again.

The following calculation specification was used to calculate the relative weight loss per hole:

The theoretical weight loss per pre-damaged point, when all the material of the pre-damaged point had been removed from the specimen, is calculated as:

$$m_{theo} = \frac{\pi}{4}d^2 h\rho$$

d: diameter of the cylindrical pre-damaged point determined from SEM images of broken edges along the pre-damaged point
h: glass thickness
ρ: density of specimen, taken from material data sheet The actual weight loss $m_{actual}$ per pre-damaged point results if the measured weight loss $m_{meas}$ is divided by the number of predamages N:

$$m_{actual} = \frac{m_{meas}}{N}$$

Forming the quotient establishes the relative mass loss:

$$m_{rel} = \frac{m_{actual}}{m_{theo}}$$

Here, on the example of a 2 mm thick glass: for a specimen thickness of h=2 mm and a density of ρ=2.5 g/$cm^3$ and a determined hole diameter of d=600±60 nm, this gives the theoretical mass loss of $m_{theo}$=1413±283 pg per pre-damaged point (for specimen thicknesses of at least 3.5 mm, the values can be determined accordingly).

The actual weight loss for $m_{meas}$=6±1 mg and N=5.8·$10^7$ is $m_{actual}$=104±17 pg per pre-damaged point.

The relative weight loss is calculated from this as 7.4±2.7%. All calculations took place taking into account error propagation.

The edge roughness of a component according to the invention which has been separated along the predetermined dividing line can be determined for example using the following methods leading to comparable results: topography determination on glass, glass ceramics, ceramics, metals, plastics and composites by means of white-light interference microscopy; high-resolution determination of surface topography on glass, glass ceramics, ceramics, metals, plastics, composites and solids by means of atomic force microscopy; tactile method by means of a profilometer; Peter de Groot, Principles of interference microscopy for the measurement of surface topography, Advances in Optics and Photonics 7, 1-65 (2015).

The sectional planes of the predamages with at least one surface of glass or glass ceramic are preferably circular. The radii of the sectional planes are here substantially the same.

The ratio of the amount difference of the hole diameter of the pre-damaged point at the surface $d_o$ of the component and the underside of the component $d_u$, to the thickness of the component h, is $T=|d_o-d_u|/(2\ h)<0.001$, particularly preferably $T<0.0001$.

The component consists of several layers, wherein the layers consist of the same material or different materials.

Preferably, the component is or can be separated along the predetermined dividing line. Particularly preferably, the component is or can be separated along the predetermined dividing line under the influence of a mechanical or thermal stress.

Preferably, the component is a window for a transport vehicle or part thereof, and is used for this.

Preferably, the component is used to produce windows of transport vehicles, in particular for producing front, rear, roof or side windows.

In order to produce a component according to the invention, the predamages are produced in the glass or glass ceramic by means of a Bessel beam of the 0th order.

The device for producing the component comprises optical means for generating a Bessel beam of the 0th order so as to produce the predamages.

The description below explains how and why, in the component according to the invention, the predamages are produced in the glass or glass ceramic, preferably by means of a Bessel beam of the 0th order.

The Bessel beam of the 0th order is preferably a pulsed laser beam. Preferably, the intensity of the laser pulse on the optical axis exceeds a threshold value of $5\times10^{16}$ W/m$^2$.

By using an optical beam-forming system in combination with a pulsed laser with a peak power of less than 200 MW, an intensity distribution is produced which is "linear" in Gauss-Bessel fashion along the optical axis, and which produces a threshold intensity of at least $5\times10^{16}$ W/m$^2$ over the entire thickness of the glass or glass ceramic (thickness in particular at least 3.5 mm, preferably at least 6 mm, quite particularly preferably at least 8 mm). Experiments have shown that this intensity is necessary to produce a pre-damaged point (microchannel) with a diameter of approximately 1 µm and a continuous length through the thickness of the entire glass or glass ceramic.

To fulfill these requirements, several conditions must be observed.

Using a beam-forming lens (e.g. with an axicon system), the laser power is fed predominantly radially into the linear intensity distribution (can be described approximately analytically as a Gauss-Bessel intensity distribution I(r,z)). This ensures that, substantially, only absorption mechanisms which are non-linear within the linear intensity distribution are present up to plasma explosion.

Figure 5:
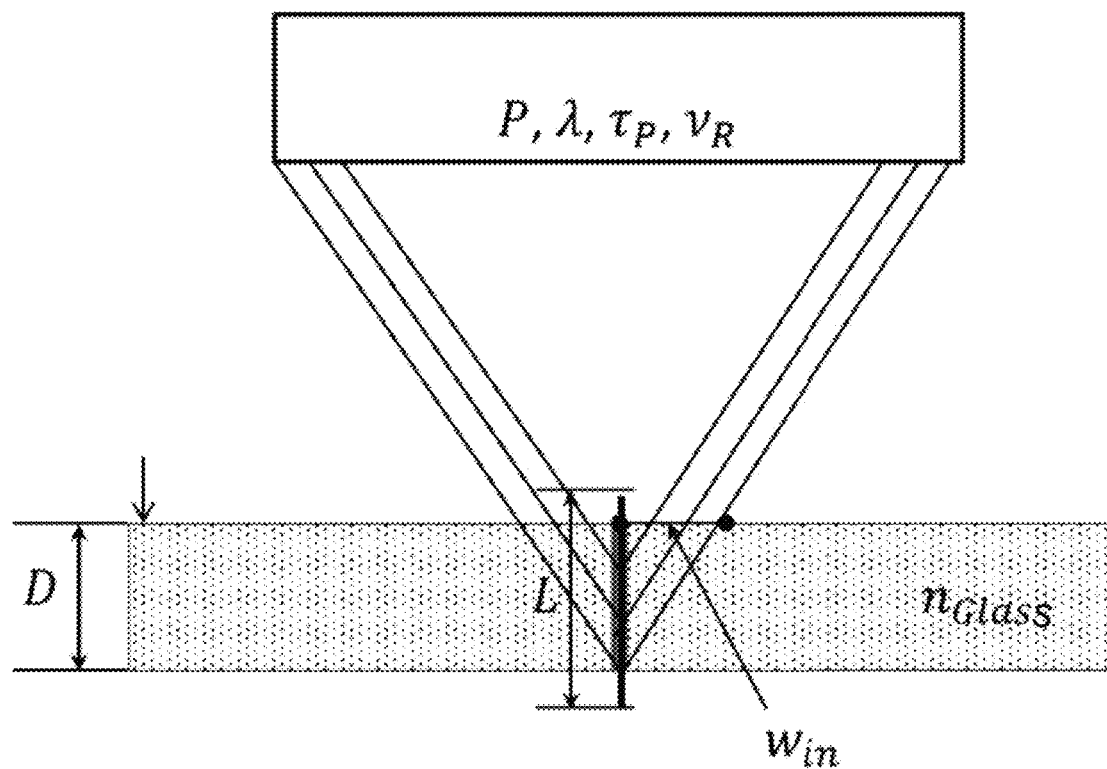
FIG. 5 shows laser power fed into a linear intensity distribution through a beam-forming lens (e.g. with an axicon system).

The length L of the linear intensity distribution must protrude by at least 0.5 mm beyond the thickness h of the dielectric material on both surfaces (FIG. 5).

Figure 6:
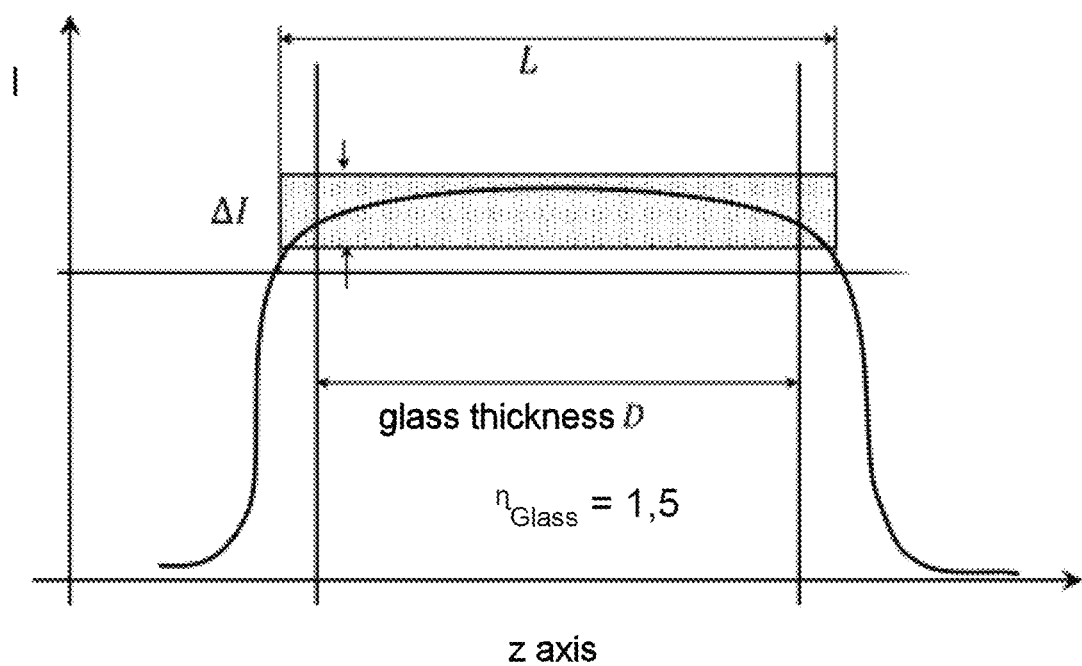
FIG. 6 shows an axial intensity distribution inside a glass or glass ceramic component.

The axial intensity distribution (FIG. 6) must be greater than around $5\times10^{16}$ W/m$^2$ inside the glass or glass ceramic. It should be distributed as homogenously as possible so that its value does not fall below this threshold value. However, it should not exceed the threshold value by more than 20%.

Figure 7:
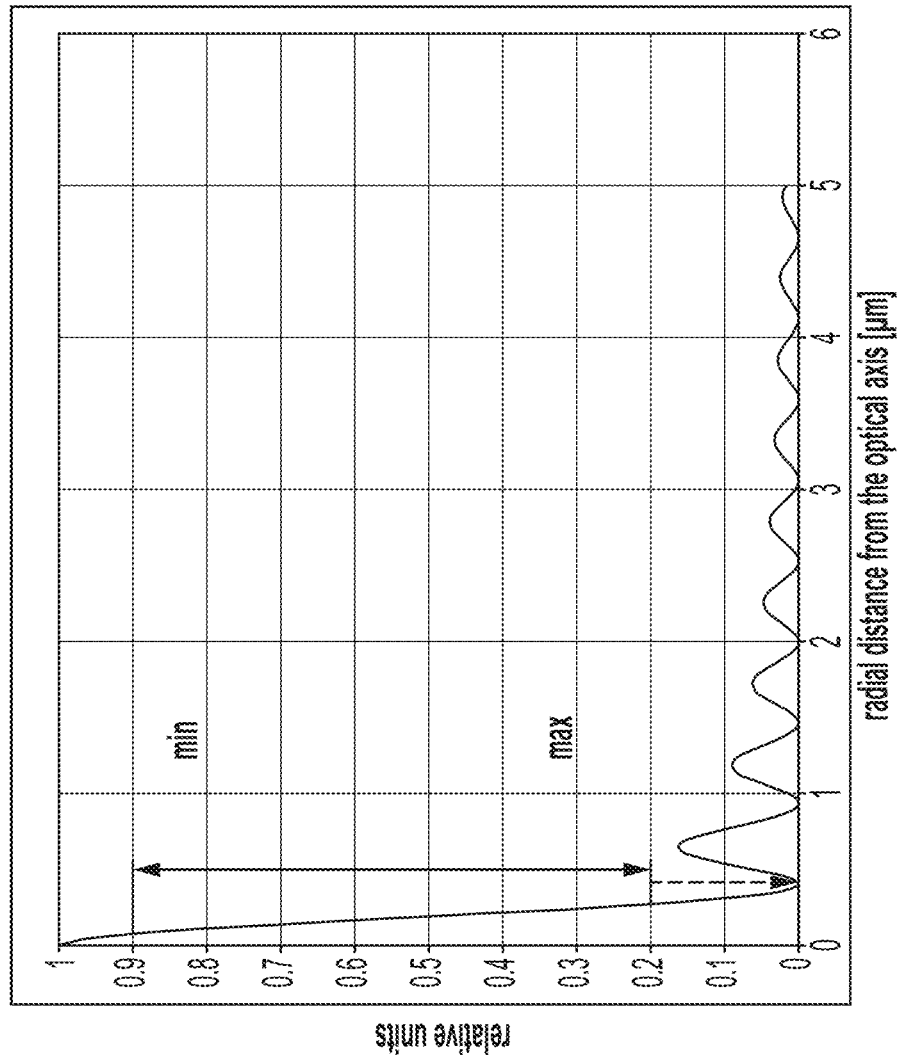
FIG. 7 shows the radial distance as a factor of the threshold value intensity.

So that this threshold value is available in as small a transverse region as possible, it is necessary that the threshold value is securely achieved only on the optical axis in the diffraction maximum of the 0th order; it is very advantageous that thereby, this radius becomes significantly smaller than the radius of the first dark diffraction ring. However, the intensity must not be so great that the first diffraction ring reaches this threshold (FIG. 7). This would lead to a massive but undesirable enlargement of the perforation channel (quite apart from the increased power demand). This means that the maximal intensity is no higher than by a factor of 6.16 of the threshold value intensity.

Figure 8:
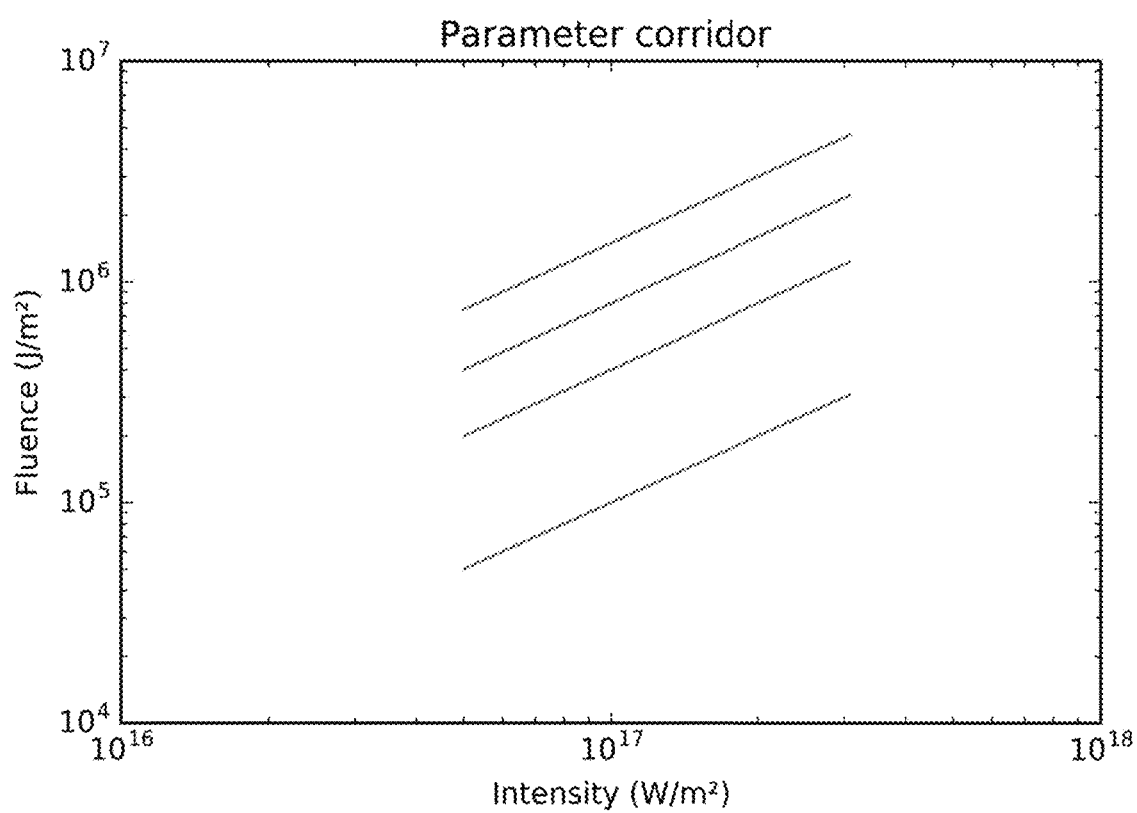
FIG. 8 shows the fluence (F) and intensity (I) in relation to each other.

To ensure that a pre-damaged point (microchannel) is produced which is as long as possible, the fluence F and intensity I along the optical axis must stand in an optimal ratio to each other (FIG. 8). It has been found that this must be $6\times10^{10}<I/F<1\times10^{12}$, preferably $1.25\times10^{11}<I/F<2.5\times10^{11}$.

These predamages (microchannels) are distinguished in that they produce an extremely low loss of weight and volume. It has been found that the predamages produced according to the above-mentioned requirements (microchannels) are configured such that they primarily result from a compaction of the material and not from vaporization. This means that, after laser bombardment, more than 95% of the hole volume, preferably more than 98%, remains in the glass or glass ceramic.

In this way, long predamages with a diameter of <1 µm can be produced in glass or glass ceramic components, even with a thickness of >3.5 mm.

The peak laser power and the beam-forming system required for this are presented in an example (two examples are shown in FIGS. 5 to 8).

Comparison example with a laser with a peak power of 20 MW, a pulse width of 10 ps and a spherical lens for beam-forming, which this does not produce a continuous micro-perforation, over a length of 8 mm.

Comparison Example: Component with Thickness Less than 3.5 MM

Laser type: ND-YAG, 1064 nm, pulsed, repetition rate 200 kHz
Pulse width (FWHM): 10 ps
Pulse energy: 200 µJ to 300 µJ
Pulse form: single pulse or pulse sequence with interval 10 to 50 ns. Pulse energy decreasing within monotone, finally constant.
In the application example: 4 pulses with interval 20 ns, pulse energy decreasing.
Beam-forming lens: biconvex lens 16 mm, Thorlabs; illuminated with 12 mm beam diameter.

Production according to the invention of a linear damaged point in a soda-lime glass of thickness 10 mm and break edge, laser peak power and pulse duration selected according to the lens used, such that the described requirements 5) and 6) fulfilled. The requirements necessary for the method can be fulfilled for example with a laser which emits 10 ps short pulses with a mean power of more than 110 W, wavelength 1064 nm, number of pulses greater than or equal to 1, glass thickness 10 mm, beam radius (beam waist) on entry into the glass <5 mm, refractive index of the glass 1.5.

Thick glass and glass ceramic substrates with predetermined dividing lines could therefore allow firstly a higher cutting precision: first cut and final dimension largely correspond. Secondly, existing process chains, in particular for coated glass and glass ceramics and composite glass panes, could be considerably simplified.

Another application is the reduction in the rejection rate: green glass which can be converted into glass ceramic and cut by means of the predetermined dividing lines on the basis of an image-processing measurement, such that the first cuts avoid regions with defects.

A further application is the cutting of stacks with thickness of at least 3.5 mm, i.e. the provision of a stack of one or more glass substrates which individually have a thickness of less than 3.5 mm, with predamages, in one process step.

EXEMPLARY EMBODIMENTS

| Component: | Glass plate |
|---|---|
| Geometry [length × width × thickness] | 50 mm × 50 mm × 3.6 mm |
| Material | Borosilicate glass |
| Cylindrical pre-damaged point: | |
| Geometry of cylindrical pre-damaged point [diameter × length] | 700 nm × 3.6 mm |
| Proportion of cylindrical predamages | 99% |
| Spacing between predamages | 7 µm |
| Mean density increase in diameter of 3 µm | 1.9% |
| Edge roughness | 1 µm |
| Relative weight loss | 1.0% |
| Component: | Glass ceramic plate |
| Geometry [length × width × thickness] | 50 mm × 50 mm × 4.1 mm |
| Material | Lithium aluminum silicate glass ceramic |
| Cylindrical pre-damaged point: | |
| Geometry of cylindrical pre-damaged point [diameter × length] | 600 nm × 4.1 mm |
| Proportion of cylindrical predamages | 99.5% |
| Spacing between predamages | 4 µm |
| Mean density increase in diameter of 3 µm | 1.5% |
| Edge roughness | 0.5 µm |
| Relative weight loss | 0.5% |
| Component: | Glass plastic laminate |
| Geometry [length × width × thickness] | 50 mm × 50 mm × 3.6 mm |
| Material | Soda-lime glass [50 mm × 50 mm × 2.3 mm] Plastic film [50 mm × 50 mm × 0.8 mm] Thermally prestressed alumino-silicate glass [50 mm × 50 mm × 0.5 mm] |
| Cylindrical pre-damaged point: | |
| Geometry of cylindrical pre-damaged point [diameter × length] | <1 µm × 3.6 mm |
| Proportion of cylindrical predamages | 99.5% |
| Spacing between predamages | 5 µm |
| Mean density increase in diameter of 3 µm | Soda-lime glass: 1.6% Thermally prestressed alumino-silicate glass: 1.7% |
| Edge roughness | 1 µm |
| Relative weight loss | 0.5% |
| Component: | Glass plastic laminate |
| Geometry [length × width × thickness] | 100 × 200 × 6.1 |
| Material | Soda-lime glass [100 mm × 200 mm × 2.75 mm] Plastic film [100 mm × 200 mm × 0.6 mm] Soda-lime glass [100 mm × 200 mm × 2.75 mm] |
| Cylindrical pre-damaged point: | |
| Geometry of cylindrical pre-damaged point [diameter × length] | <1 µm × 6 mm |
| Proportion of cylindrical predamages | 99.5% |
| Spacing between predamages | 5 µm |
| Mean density increase in diameter of 3 µm | 1.6% |
| Edge roughness | 1 µm |
| Relative weight loss | 0.5% |

The following laser parameters were used for example to produce components according to exemplary embodiments:
Laser type: ND-YAG, 1035 nm, pulsed, repetition rate 1 to 300 kHz
Pulse width (FWHM): 10 ps
Pulse energy: 900 µJ
Pulse form: single pulse or pulse sequence with interval 14 ns, 2 ns, 14 ns; pulse energy constant. In the application example: 4 pulses at interval of 20 ns, pulse energy decreasing.
Beam-forming lens: quartz glass axicon with 20° cone angle (140° apex angle).

The process speed v results from the repetition rate R, in each case from the desired interval L of the individual modifications, as v=L×R; e.g. v=10 µm×100 kHz=1000 mm/s.

FIG. 1a shows diagrammatically in top view an enlarged extract of a 3.8 mm thick floated borosilicate glass with predamages arranged along a predefined dividing line, wherein the predamages are cylindrically symmetrical, the material has a compaction of at least 1% relative to the actual material density in a radius of 3 µm about the longitudinal axis of the respective cylindrically symmetrical pre-damaged point, and the relative weight loss per pre-damaged point is less than 10%. The predamages are spaced apart from each other along the dividing line at intervals of approximately 7.14 µm.

Figure 1B:
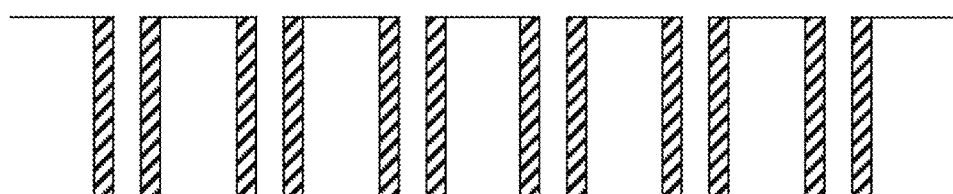
FIG. 1b shows an edge view of the component from FIG. 1a after separation along a dividing line.

FIG. 1b shows the edge view of the component from FIG. 1a after it has been separated along the dividing line.

Figure 1C:
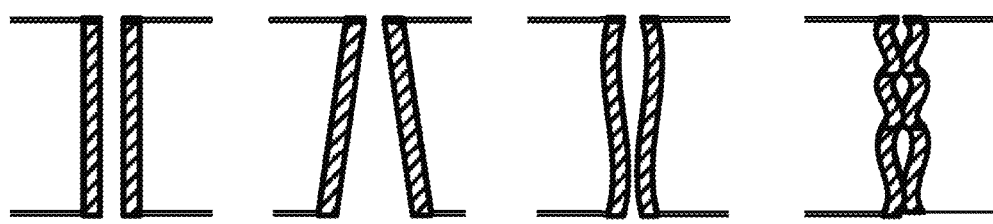
FIG. 1c shows diagrammatically the edge views of various cylindrically symmetrical predamages according to the present disclosure.

FIG. 1c shows diagrammatically the side view of various cylindrically symmetrical predamages.

Figure 2A:
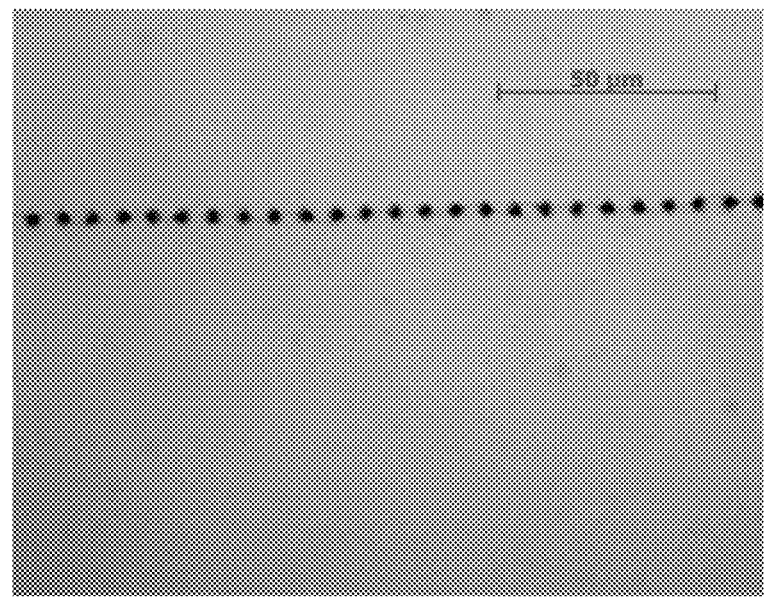
FIG. 2a shows a photograph in top view of a component according to the present disclosure.
Figure 2B:
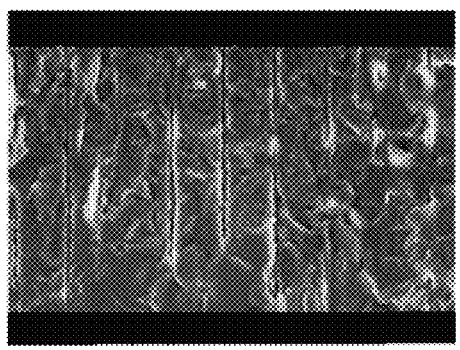
FIGS. 2b and 2c show photographs in side views of a component according to the present disclosure.
Figure 2C:
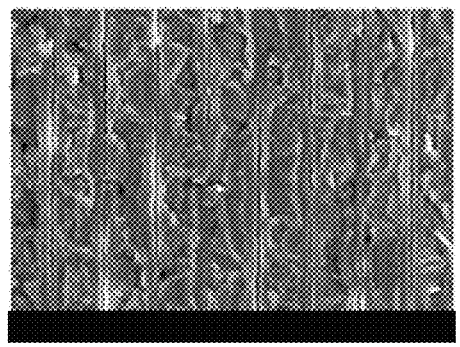

FIG. 2a shows in top view, and FIGS. 2b and 2c in side view, a component according to the invention (photographs).

Figure 3:
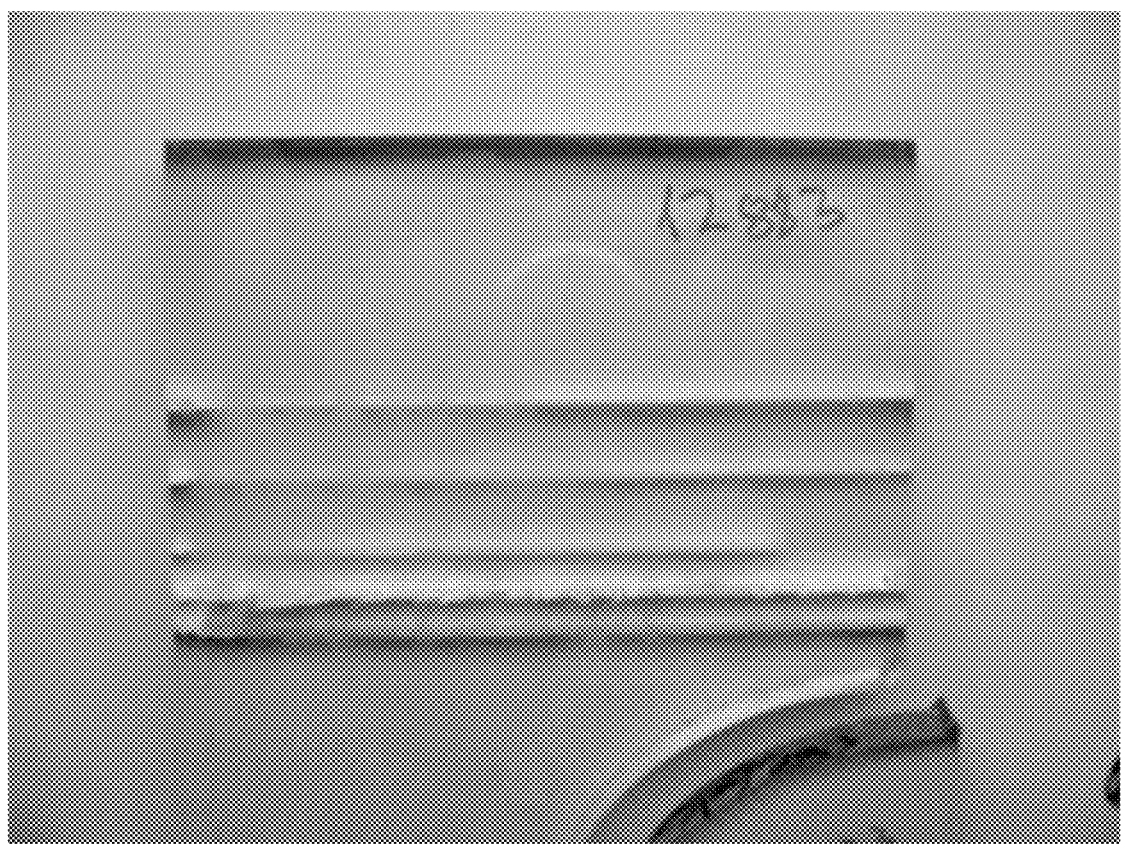
FIG. 3 shows in top view a glass component with predamages according to the present disclosure.

FIG. 3 shows in top view a section of a 3.8 mm thick floated borosilicate glass with predamages arranged along a predetermined dividing line, wherein the predamages are not cylindrically symmetrical, in a radius of 3 µm about the longitudinal axis of the respective cylindrically symmetrical.

The predamages are spaced apart from each other along the dividing line by intervals of approximately 7.18 µm.

FIGS. 4a and 4b show 2D matrices formed from the cylindrical predamages, from which the weight loss was determined.

The invention claimed is:

1. A method for producing a glass or glass ceramic component, the method comprising:
   providing a glass or glass ceramic component;
   generating a laser beam with a beam-forming system and directing the beam to the glass or glass ceramic component; and
   causing a plurality of predamages in the glass or glass ceramic component with the beam,
   wherein each predamage in the plurality of predamages is caused to be one behind the other along a dividing line, and
   wherein each predamage is caused to pass continuously through the glass or the glass ceramic component so that there is a material compaction of the glass or glass ceramic component of at least 1% relative to an actual material density in a radius of 3 µm about a longitudinal axis of each predamage and so that the glass or the glass ceramic has a relative weight loss per predamage that is less than 10%.

2. The method of claim 1, wherein the predamages are caused so that each predamage has a sectional plane at a surface of the glass or glass ceramic component that is circular.

3. The method of claim 1, wherein the predamages are caused so that the plurality of predamages have a radii that are substantially the same.

4. The method of claim 1, wherein the predamages are caused so that a ratio of an absolute value of a difference between a diameter of the predamage at the surface to twice a diameter of the predamage at an opposite surface to the thickness is <0.001.

5. The method of claim 1, wherein the providing of a glass or glass ceramic component is a component that has a plurality of layers, and wherein the plurality of layers consists of different materials.

6. The method of claim 1, further comprising separating the glass or glass ceramic component along the dividing line.

7. The method of claim 6, wherein the separating comprises applying a mechanical or thermal stress.

8. The method of claim 1, further comprising maintaining a fluence F and intensity I along an optical axis of the beam-forming system in a ratio that is $6 \times 10^{10} < I/F < 1 \times 10^{12}$.

9. The method of claim 1, further comprising producing a threshold intensity of at least $5 \times 10^{16} W/m^2$ on an optical axis of the beam-forming system.

10. The method of claim 1, wherein the beam-forming system comprises an optical beam-forming system with a pulsed laser with a peak power of less than 200 MW.

11. The method of claim 1, wherein the beam-forming system comprises a laser that emits less than 10 picosecond short pulses with a mean power of more than 110 W.

12. The method of claim 1, wherein the beam-forming system comprises an axicon.

13. The method of claim 1, wherein the beam-forming system comprises a beam radius on entry into the glass of less than 5 mm.

14. The method of claim 1, wherein at least 95% of the plurality of predamages are cylindrically symmetrical.

15. The method of claim 1, wherein at least 98% of the plurality of predamages are cylindrically symmetrical.

16. The method of claim 1, further comprising exceeding a threshold value of $5 \times 10^{16}$ $W/m^2$ of an Intensity of laser pulses an optical axis of the beam-forming system inside the glass or glass ceramic component.

17. The method of claim 16, wherein the exceeding is by less than 20% of the threshold value.

18. The method of claim 1, wherein the laser beam is a Bessel beam of $0^{th}$ order.

19. The method of claim 1, wherein at least 90% of the plurality of predamages are cylindrically symmetrical.

* * * * *